United States Patent [19]

Castrodale et al.

[11] 4,170,030
[45] Oct. 2, 1979

[54] DRIVE MACHINE MOVING MAGNETIC DISKS ONLY PARTIALLY THEREIN FOR DATA TRANSFER

[75] Inventors: Daniel O. Castrodale; Thomas R. Fournier, both of Rochester, Minn.

[73] Assignee: International Business Machines Corporation, Armonk, N.Y.

[21] Appl. No.: 888,437

[22] Filed: Mar. 20, 1978

[51] Int. Cl.² .................... G11B 5/012; G11B 5/82
[52] U.S. Cl. .................... 360/98; 179/100.4 R; 274/10 D
[58] Field of Search .................... 360/98, 86, 133; 179/100.4 R; 274/10 E, 10 D, 8; 346/137

[56] References Cited

U.S. PATENT DOCUMENTS

| | | | |
|---|---|---|---|
| 2,281,547 | 5/1942 | Andrews | 274/10 D |
| 3,836,731 | 9/1974 | Wilisch | 179/100.4 R |
| 3,846,836 | 11/1974 | Masse | 360/98 |
| 3,912,279 | 10/1975 | Paul | 360/86 |
| 3,913,137 | 10/1975 | Morgan | 360/98 |
| 4,101,027 | 7/1978 | Kohl et al. | 360/98 |

*Primary Examiner*—Jay P. Lucas
*Attorney, Agent, or Firm*—Keith T. Bleuer

[57] ABSTRACT

A machine operative to sequentially pull jacketed flexible magnetic disks (which may be termed "diskettes") into a data transferring position in the machine directly from a carriage or from a magazine carried by the carriage and to return the diskette back into the carriage or magazine. The jackets of the diskettes are square; and the carriage and the magazine are provided with flat sided, flat bottomed store grooves for holding such diskettes. The machine is likewise provided with a diskette receptor groove having flat sides and a flat bottom and holding a diskette in its data transferring position in the machine. The flat sided and bottomed grooves cooperating with the square diskette jackets prevent a binding or jamming of the diskettes as they are moved from the carriage or magazine into the machine and back again, and the movement of a diskette is only partially out of a store groove in the carriage or magazine so that the diskette is certain to be moved completely back into its original store groove in the carriage or magazine after a data transfer has taken place and so that the machine is shortened to this extent. The carriage has a few store grooves for a few diskettes desired to be individually used, and the magazine has a greater number of diskette store grooves for a group of diskettes desired to be used together.

6 Claims, 9 Drawing Figures

4,170,030

DRIVE MACHINE MOVING MAGNETIC DISKS ONLY PARTIALLY THEREIN FOR DATA TRANSFER

CROSS-REFERENCES TO RELATED APPLICATIONS

The invention hereof is related to those of the following applications:

Disk File Machine For Jacketed Flexible Magnetic Disks, Inventors: W. E. Beuch et al, Ser. No. 888,603, filed Mar. 20, 1978.

Gripping Device For Magnetic Diskettes, Inventors: W. E. Beuch et al, Ser. No. 888,601, filed Mar. 20, 1978.

Magazine-Lid Combination For Jacketed Magnetic Disks, Inventors: M. E. Bothun et al, Ser. No. 888,438, filed Mar. 20, 1978.

Magnetic Diskette Magazine, Inventor: D. R. Wilson, Ser. No. 888,435, filed Mar. 20, 1978.

Magazine For Multiple Magnetic Diskettes, Inventors: W. L. Aderman et al, Ser. No. 888,436, filed Mar. 20, 1978.

BACKGROUND OF THE INVENTION

The invention relates to jacketed magnetic record disks (which may be termed "diskettes"), and still more particularly the invention relates to a disk file machine for selectively drawing such diskettes into the machine for a data transferring action.

Jacketed magnetic disks or diskettes have previously been proposed, for example, in U.S. Pat. No. 3,668,658. A disk file machine for utilizing a series of such diskettes has also been proposed in U.S. Pat. No. 3,846,836. The machine disclosed in the latter patent includes a bin on top of the machine for holding a series of the diskettes. The diskettes are dropped serially one at a time, completely out of the bin, into a data transferring position; and the machine includes mechanism for then driving the disk rotatively and moving a transducer into engagement with the disk for a data transferring action while the disk is in this data transferring position. When this action is completed, the steps are reversed to move the transducer out of engagement with the disk and to then move the diskette upwardly back into the bin.

SUMMARY OF THE INVENTION

It is an object of the present invention to provide an improved disk file machine particularly for jacketed flexible magnetic disks or diskettes by means of which individual ones of a series of such diskettes may be selectively loaded into a data transferring position from original positions in store grooves contained in a carriage or in a magazine mounted on the carriage. The carriage is movable transversely of the plane of a diskette in its data transferring position so as to bring different ones of the diskette containing grooves into this plane.

More particularly, it is an object of the invention to move the diskettes from original positions in diskette store grooves in such a manner that the diskettes are assured of moving back into identically the same store grooves in which they were originally placed whereby any certain one of the diskettes may be operated on by the machine simply by moving the carriage to the same position as previously for this same diskette.

In this connection, it is a more specific object of the invention to provide such a machine having a data transferring position in such close proximity to a diskette in its original position in its store groove of the carriage or magazine so that the diskette remains partially in this groove when it is in its data transferring position in the machine whereby the diskette is certain to be returned into the same store groove as that in which it was originally and whereby the machine is shortened by the amount the diskette remains in its original store groove.

It is also an object to provide an improved carriage construction having just a few store grooves therein for receiving a few individual diskettes for individual usage thereof and having at least one cavity for receiving a magazine adapted to store a greater number of diskettes that will be used as a group.

DESCRIPTION OF THE PREFERRED EMBODIMENT

Figure 7:
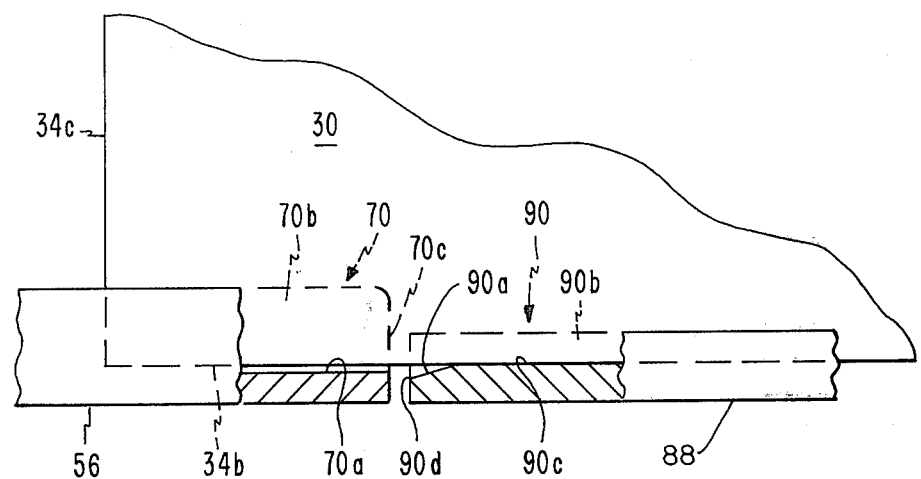
FIG. 7 is a fragmentary sectional view on an enlarged scale taken on line 7—7 of FIG. 3 and showing the translatable carriage in a position slightly shifted from its FIG. 1 position.
Figure 6:
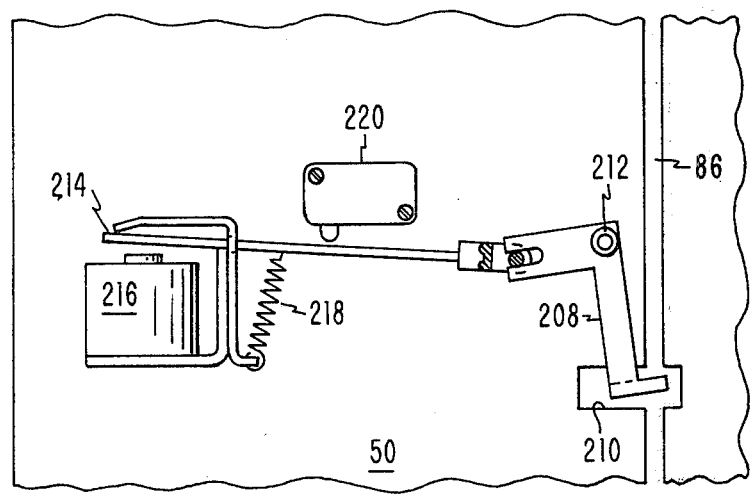
FIG. 6 is a fragmentary sectional view on an enlarged scale taken on line 6—6 of FIG. 1.
Figure 8:
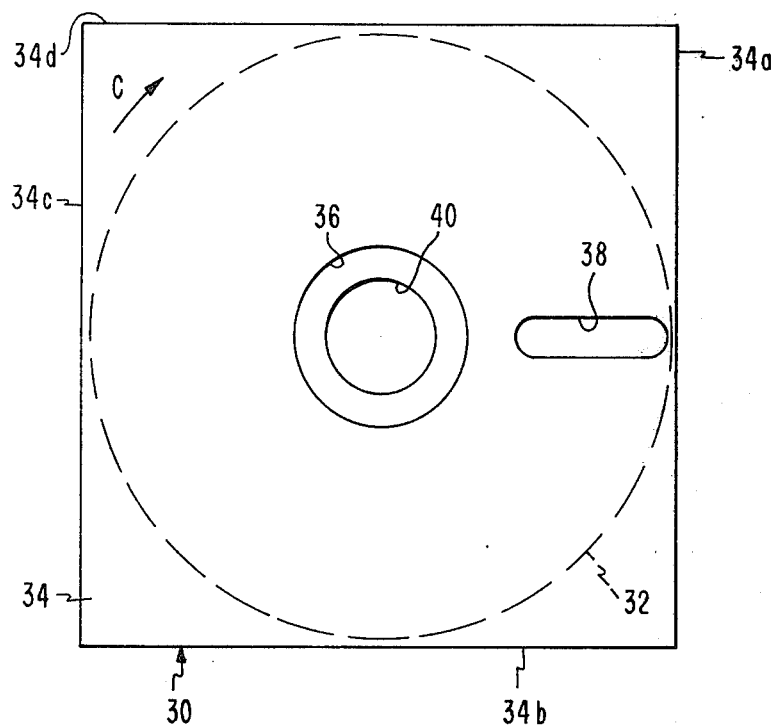
FIG. 8 is a plan view of a disk-jacket unit or "diskette" that may be used in the machine.

The disk file machine shown in FIGS. 1-7 utilizes jacketed magnetic disk units or assemblies 30 of the type disclosed in U.S. Pat. No. 3,668,658. These may be termed "diskettes". Such an assembly 30 is shown in FIG. 8 and comprises a thin flat flexible magnetic disk 32 of plastic material rotatably disposed in a thin flat square jacket 34 of somewhat thicker but somewhat flexible plastic material. As the diskette is shown in FIG. 8, it has the straight bottom, top and side edges 34a, 34b, 34c and 34d. The jacket 34 has coincident central openings 36 and coincident radially extending oblong openings or slots 38 in its two thicknesses. The disk 32 has a central opening 40 which is of smaller diameter than the openings 36 so that the disk 34 is revealed within the openings 36.

Figure 9:
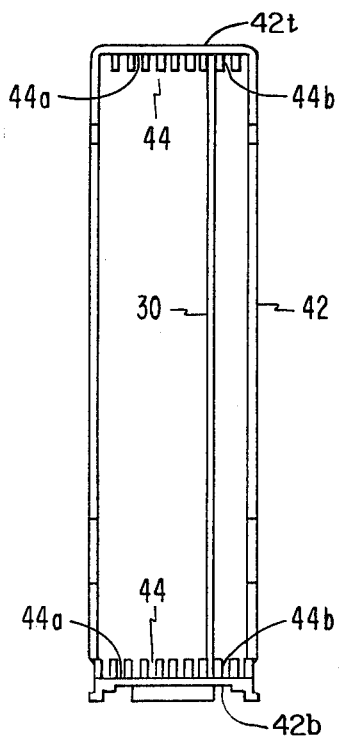
FIG. 9 is a cross-sectional view of one of the magazines usable with the machine and taken on line 9—9 of FIG. 1.

The jacketed disk assemblies 30 may be used individually by the disk drive machine or may be disposed in an aligned series within magazines 42 (see FIGS. 1, 2 and 9) which are adapted to be received by the machine. Each of the magazines 42 has a bottom 42b and a top 42t and is provided with internal parallel grooves 44 in the bottom 42b and top 42t. There are the same number of grooves 44 in the bottom 42b and top 42t, and they all have the same dimensions transversely so that each of the grooves 44 in the top 42t is directly above a groove 44 in the bottom 42b. Disk assemblies 30 are stored in the grooves 44, and each is held from sideward movement in the magazine by the sides 44b of a pair of grooves 44 vertically aligned with each other. The groove bottoms 44a and the groove sides 44b are all flat surfaces (see FIG. 9).

Figure 1:
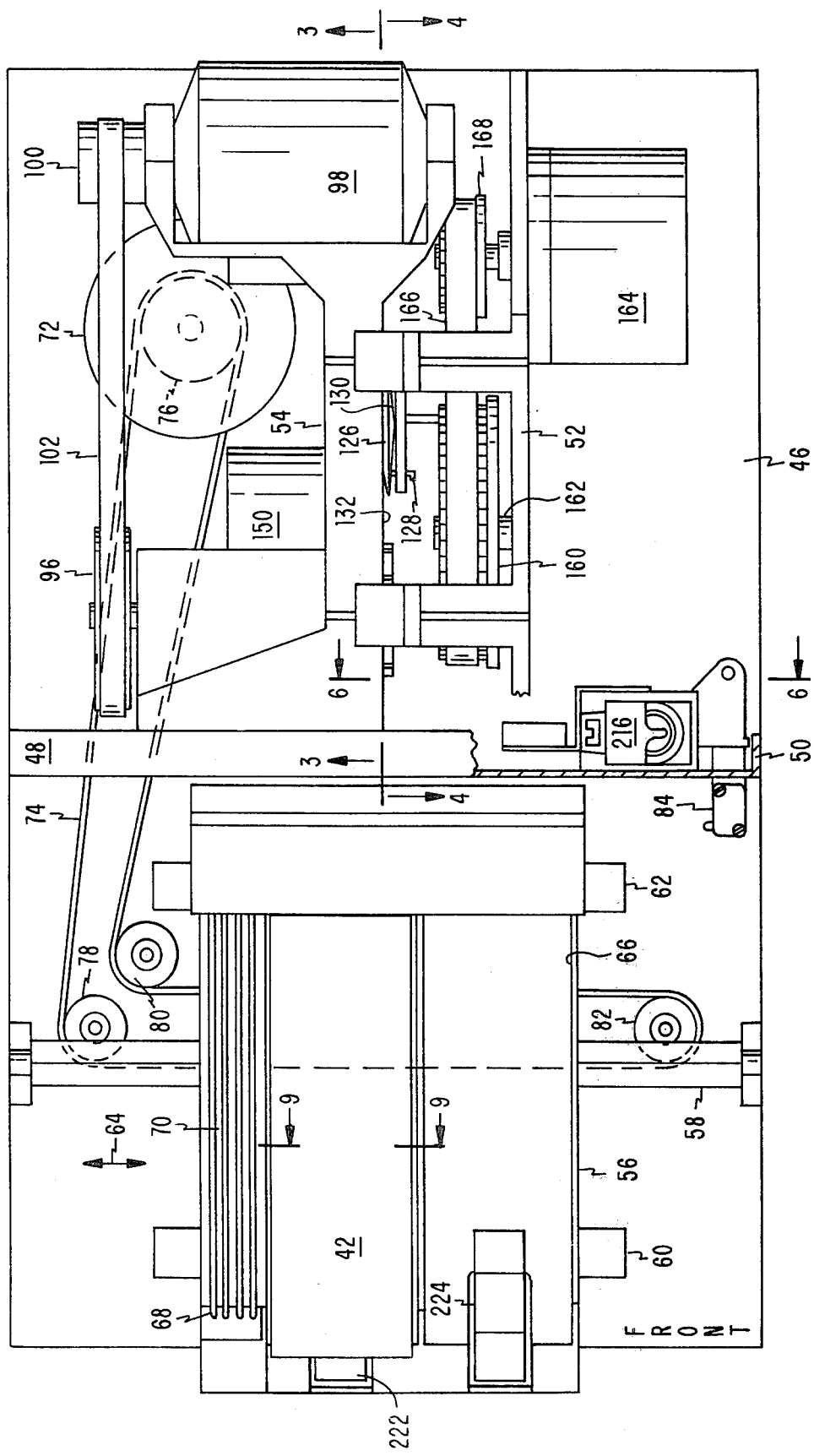
FIG. 1 is a top plan view of a disk file machine incorporating the invention, the machine being illustrated with a so-called "front" end on which a translatable diskette carrying carriage and magazine are shown (on the left end of the figure)
Figure 2:
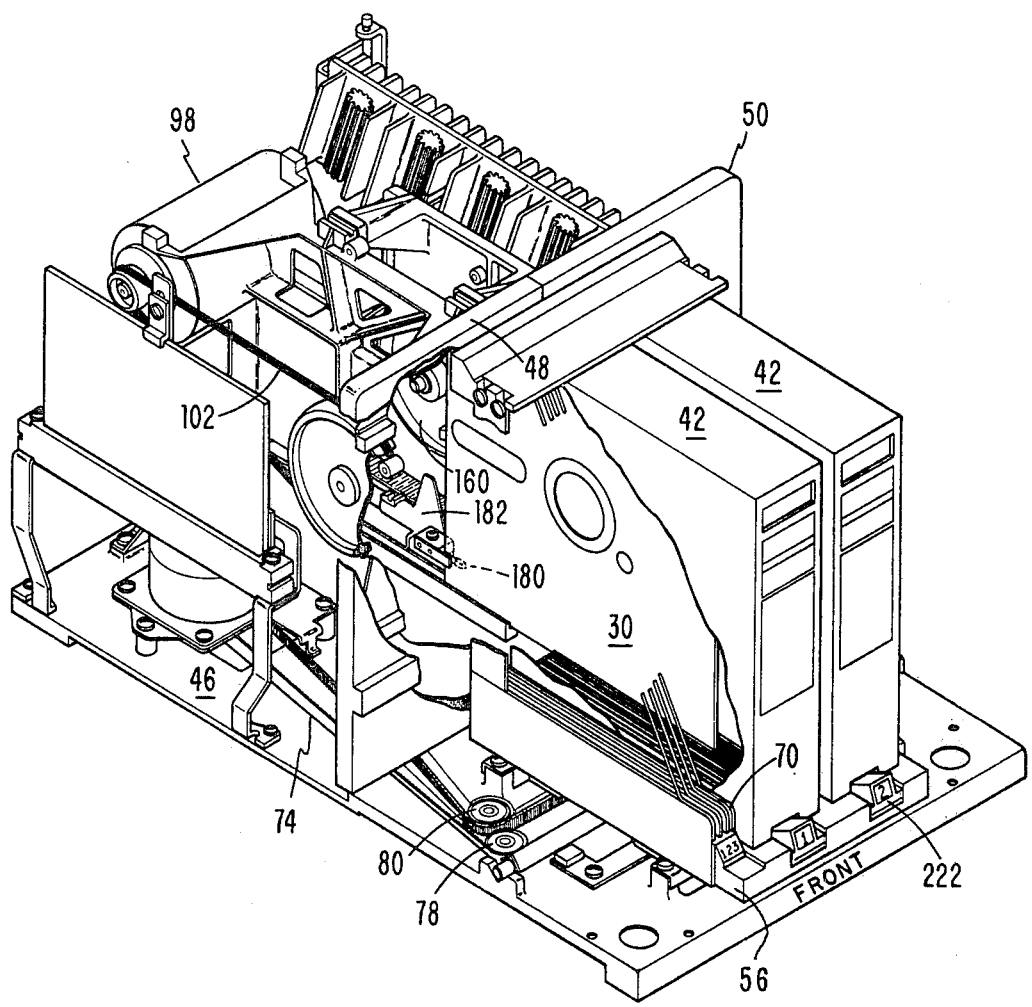
FIG. 2 is an isometric view of the machine taken from the left front end thereof and showing a pair of the magazines and showing also a pair of electronic boards on the left and right sides of the machine.

The machine comprises a rigid horizontal bed or base 46, a pair of upright standards 48 and 50 fixed to the base 46 and a pair of upright backbones 52 and 54 also fixed to the base 46 (see FIG. 1). A carriage 56 in the form of a tray for receiving the magazines 42 and also for receiving individual disk assemblies 30 is translatably disposed on the base 46 by means of a center rail 58 and a pair of side rails 60 and 62. Suitable rollers or other low friction bearing means may be provided for supporting the carriage 56 with respect to the rails 58, 60 and 62 so that the carriage 56 may move in the direction 64 across the bed 46. The carriage 56 is provided with a pair of cavities 66 each for receiving one of the magazines 42 and is also provided with a series of upwardly slanting spaced support rods 68 between which the disk assemblies 30 may be individually disposed. The carriage 56 is provided with horizontal parallel open top diskette store grooves 70 disposed vertically between each of the spaces between the rods 68 for supporting the lower edges 34b of the individual disk assemblies 30 disposed between the rods 68. The grooves 70 have flat horizontal bottoms 70a and flat vertical side faces 70b (see FIG. 7), and the rear end of the groove 70 is indicated at 70c in FIG. 7.

The carriage 56 is moved in the direction 64 by means of a motor 72 which is preferably of the electrical stepping type. This is accomplished by means of a belt 74 which is of rubber like material and is preferably internally toothed. The belt 74 passes over the drive pulley 76 of the motor 72 and over idlers 78, 80 and 82. The pass of the belt 74 between the idlers 78 and 82 is fixed to the carriage 56 so that, as the belt 74 is driven by the motor 72, it moves the carriage 56 in the direction 64. A sensor switch 84 is provided at one end of the travel of the carriage 56.

A diskette receiving slot 86 (see FIGS. 3 and 6) is provided between the standards 48 and 50, and a diskette supporting member 88 is fixed to the lower edge of the backbone 52 and extends partially into the slot 86. The member 88 is provided with a horizontal diskette receptor groove 90 for receiving a diskette 30 moved into the machine through the slot 86, and a protrusion 91 on the backbone 52 limits movement of the diskette 30 in the slot 90. A sensor switch 92 is provided at the end of the groove 90 remote from the slot 86. The groove 90 has a flat horizontal bottom surface 90c and flat vertical side faces 90b (see FIG. 7). The bottom surface 90c is slightly higher than the bottom surface 70a; and the groove 90 is provided with an initial, upwardly slanting bottom cam surface 90a connected with the surface 90c and having its front edge 90d slightly lower than the surface 70a.

Figure 3:
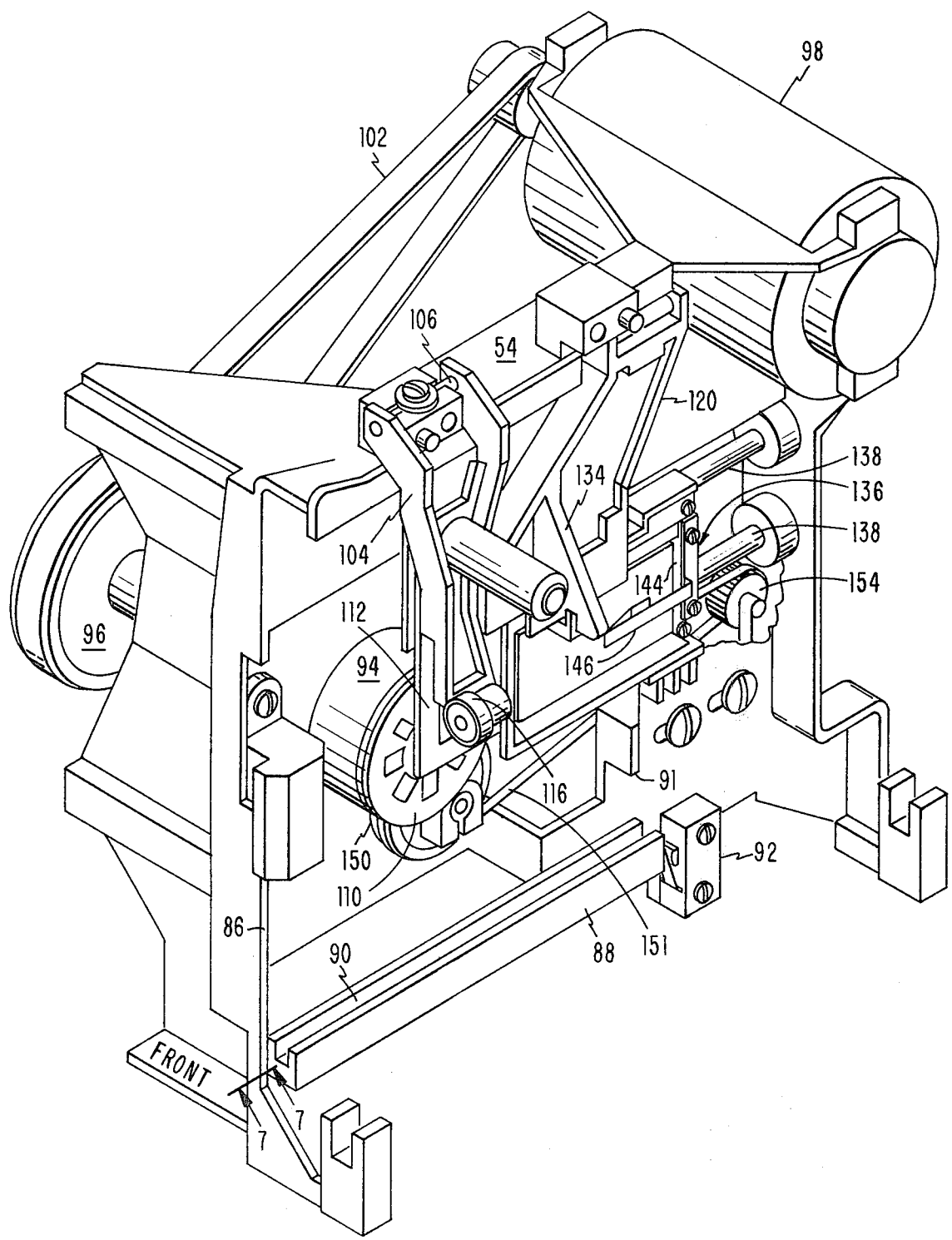
FIG. 3 is an isometric view of internal parts of the machine and taken substantially from line 3—3 of FIG. 1 in the direction indicated.

A disk drive spindle 94 is rotatably disposed in the backbone 54, and the spindle 94 is rotatably driven by means of a pulley 96 fixed with respect to the spindle 94 (see FIGS. 1 and 3). The pulley 96 and therefore the spindle 94 are driven from a drive motor 98 by means of the driven pulley 100 of the motor 98 and a belt 102 extending around the pulleys 100 and 96.

An arm 104 is swingably mounted on the backbone 54 by means of a pivot rod 106 (see FIG. 3). A suitable return spring (not shown) is provided to yieldably hold the arm 104 swung away from the spindle 94. A collet 110 is carried by and has a lost motion connection with a downward extension 112 of the swing arm 104, and spring means (not shown) is provided between the collet 110 and the extension 112. The swing arm 104 carries a roller 116 on its lower end.

Figure 5:
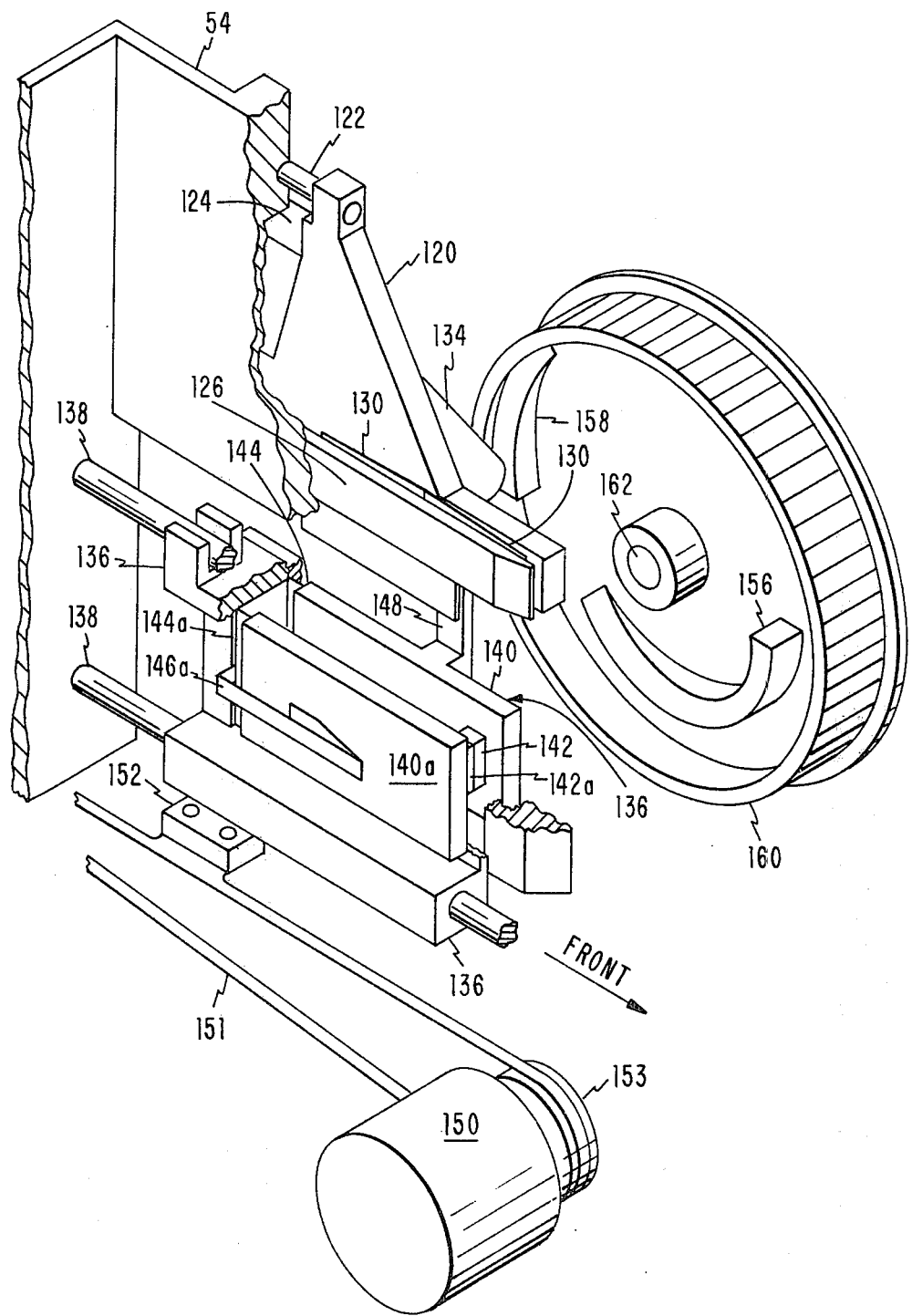
FIG. 5 is a fragmentary isometric view on an enlarged scale taken from substantially the same standpoint as FIG. 4 and showing the cam wheel above-mentioned along with other internal parts movable under the action of the cam wheel.

An arm 120 is swingably disposed on the backbone 54 by means of a pivot rod 122 (see FIG. 5), and a return spring 124 is effective between the swing arm 120 and the backbone 54 for yieldably holding the swing arm 120 swung outwardly in the counterclockwise direction as seen in FIG. 5. The swing arm 120 carries a pressure member 126 having a lost motion connection with the swing arm 124 by virtue of a pair of ears 128 (see FIG. 1) integral with the pressure member 126 and extending through slots in the swing arm 120 and formed to overlie the back surface of the swing arm 120. A leaf spring 130 is disposed between the pressure member 126 and the swing arm 120 for yieldably holding the portions of the ears 128 overlying the swing arm 120 in contact with the swing arm 120. The backbone 54 is provided with a platen surface 132 (see FIG. 1) opposite the pressure member 126. The swing arm 120 is provided with an extension 134 for moving the swing arm as will be hereinafter described.

A transducer carriage assembly 136 (see FIGS. 3 and 5) is slideably disposed on a pair of guide rods 138 which are fixed to and within the backbone 54 to extend horizontally as the machine is illustrated. The carriage assembly 136 may be that disclosed in the copending application of Castrodale et al, Ser. No. 776,456, filed Mar. 10, 1977, (now U.S. Pat. No. 4,089,029, issued May 9, 1978) and includes a swing arm 140 carrying a magnetic head or transducer 142 that is adapted to extend through a slot 38 in a diskette 30 for data transferring action when the diskette 30 is in a reading/writing data transferring position in the machine as will be subsequently explained. The swing arm 140 is mounted with respect to the main body of the assembly 136 by means of a thin flexure spring 144, and a return spring 146 is provided for yieldably moving the swing arm 140 in the direction toward the left side of the machine (which is the same as the left side of the FIG. 3 assembly). The assembly 136 also carries a similar swing arm 140a on its opposite side carrying a transducer 142a to be simultaneously effective on the disk 32 of a diskette 30 along with the transducer 142. The swing arm 140a is supported by flexure spring 144a and is acted on by return spring 146a (see FIG. 5), springs 144a and 146a being similar to springs 144 and 146. The two swing arms 140 and 140a may be interconnected so that they move together in accordance with the teachings of said Castrodale et al application. The swing arm 140 is provided with a tab 148 which overlies the swing arm 120 so that as the swing arm 120 is moved under the action of the spring 124 (in the counterclockwise direction as seen in FIG. 5), it engages the tab 148 and moves the swing arm 140 against the action of the return spring 146 to disengage the transducer 142 with respect to a disk 32 then beneath the transducer 142. This action of the swing arm 120 will likewise move transducer 142a on the opposite side of the disk 32 away from the disk due to the interconnection between the arms 140 and 140a as described in said Castrodale et al application.

The transducer assembly 136 is slideably moved on the rods 138 (see FIGS. 3 and 5) by means of an electric motor 150 preferably of the electrical stepping type. A thin flexible metal band 151 has a fixed connection 152 with the assembly 136, and the band 151 extends around the output pulley 153 of the motor 150 and around an idler pulley 154 (see FIG. 3) carried by the backbone 54 for moving the transducer carriage assembly 136 when the motor 150 is actuated.

Figure 4:
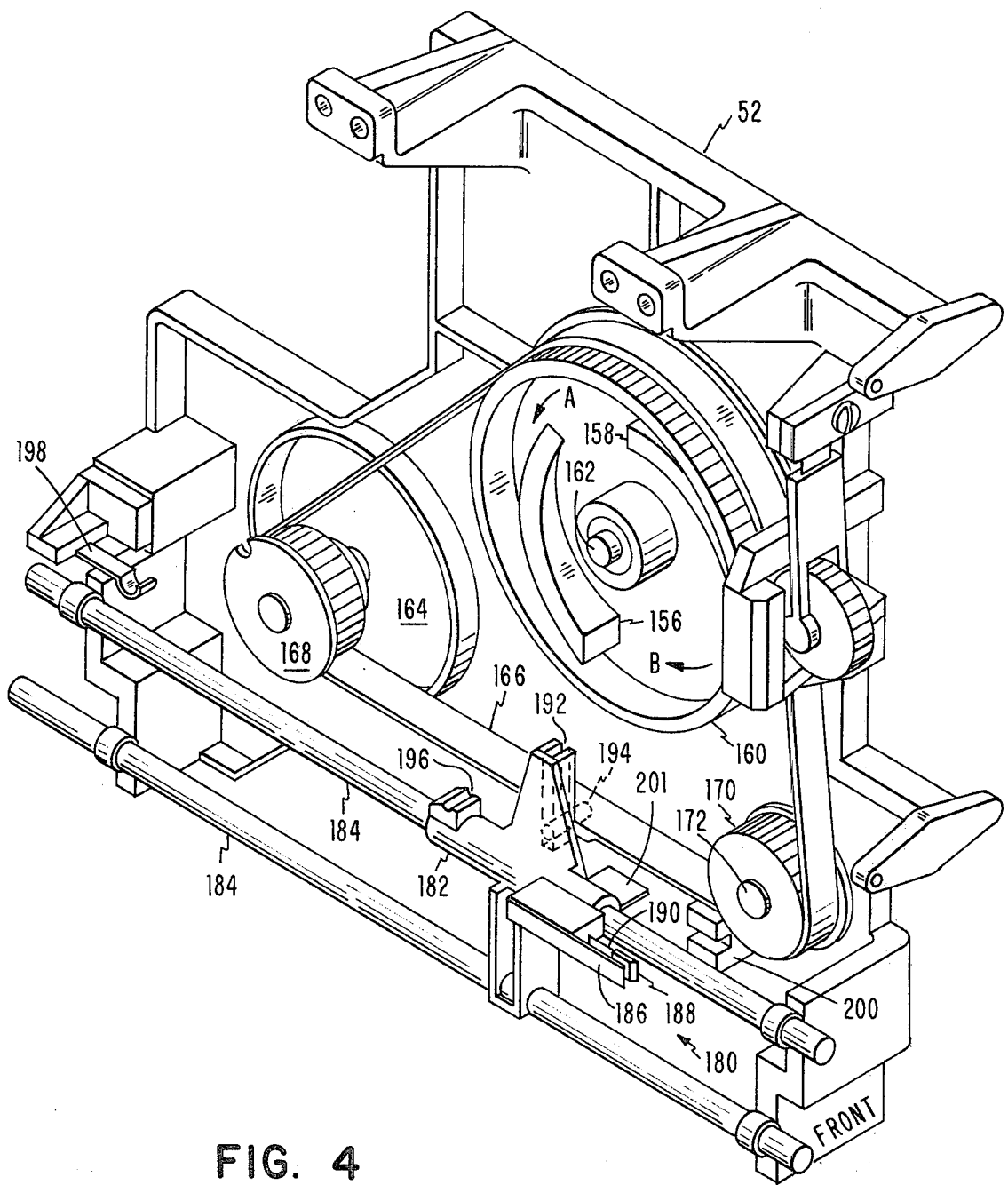
FIG. 4 is an isometric view of other internal parts of the machine including a rotatable cam wheel and taken from line 4—4 of FIG. 1 in the direction indicated.

The swing arms 104 and 120 are moved against their return springs by means of cams 156 and 158 formed on a cam roll or wheel 160 (see FIGS. 4 and 5). The cam wheel 160 is rotatably disposed on the backbone 52 by means of a shaft 162 fixed to the backbone 52. The cam wheel 160 is driven by means of a motor 164 of the electrical stepping type and is in particular driven by an internally toothed belt 166 that passes around the output pulley or roll 168 of the motor 164 and around an idler pulley or roll 170 rotatably disposed on a shaft 172 that is fixed in the backbone 52. The wheel 160 and pulleys 168 and 170 are externally toothed to match with the internal teeth on the belt 166. It will be observed from FIGS. 4 and 5 that the cams 156 and 158 are nearly diametrically opposite each other and that the cam 156 is located closer to the center of the wheel 160 than the cam 158. The cam 156 is in alignment with the roller 116 so that it acts on the roller 116 and moves the swing arm 104 against its return spring, and the cam 158 is in alignment with the lever extension 134 so that the cam 158 swings the arm 120 against the action of its return spring. It will be observed from FIG. 3 that the roller 116 and the end of the lever extension 134 are just about opposite each other (substantially on the same level with respect to the bed 46), and the cams 156 and 158 are effective on the roller 116 and the lever extension 134 therefore at approximately the same time as the wheel 160 rotates. The cam wheel 160 may rotate in either the direction A or in the reverse direction B as indicated in FIG. 4.

A diskette picker assembly 180 is fixed on a reciprocative member 182 that is slideable on a pair of rods 184 held by and fixed with respect to the backbone 52 (see FIG. 4). The assembly 180 includes a pair of arms 186 and 188 anchored in the reciprocable member 182, and the arms 186 and 188 have outwardly diverging cam surfaces on their ends so as to have a clothespin-like configuration and function in this respect. The arm 186 is rigid for its complete length, and the arm 188 has a thin flexible flat spring portion 190 so that the arm ends of the assembly 180 are thus yieldably held together. The assembly 180 may more specifically have the construction disclosed in the copending Beuch et al application, Ser. No. 888,601, filed Mar. 27, 1978.

The reciprocative member 182 is provided with a vertical slot 192, and the slot 192 is adapted to receive the end of a pin 194 that is vulcanized onto the outer side of the belt 166. The reciprocative member 182 is provided with a notch 196, and a detent spring 198 carried by the backbone 52 is adapted to enter into the notch 196 at one end of the travel of the member 182. A sensor switch 200 is provided at the other end of the travel of the reciprocative member 182. The sensor switch 200 may be of the photoelectric type and may be actuated by a blade 201 carried by the member 182.

In order to strip the picker assembly 180 from a diskette 30, it is necessary to hold the diskette from movement. A diskette blocker 208 is provided for this purpose (see FIG. 6), and it extends through a transversely extending slot 210 in communication with the slot 86 between the standards 48 and 50. The blocker 208 is swingably disposed on a pin 212 fixed to the back side of the standard 50, and the blocker 208 is actuated by the swingable armature 214 of an electromagnet 216 that is fixed to the backside of the standard 50. A return spring 218 is provided for the armature 214, and a sensor switch 220 detects the position of the armature 214.

A magazine 42 may be held by any suitable means in a cavity 66 provided in the carriage 56. Such means may include a latch 222 which is urged against the back end of a magazine 42 by means of a leaf spring 224 (see FIGS. 1 and 2).

In operation, a diskette 30 may be positioned for example between a pair of the rods 68 and in the corresponding slot 70 of the carriage 56 to be in an original loading position. The rods 68 and the slot slides 70b function as spacers and supports for this diskette 30 and any in the other slots 70. The diskette 30 is positioned within the groove 70 in the disposition in which it is shown in FIG. 8; with the slots 38 extending horizontally and with the jacket edge 34a, which is that jacket edge adjacent the slots 38, being located at the slot 86 and at the standards 48 and 50. The diskette bottom edge 34b rests on the bottom surface 70a of the groove 70 in which the diskette 30 is disposed. The picker assembly 180 at this time is drawn inwardly of the machine and may be in its FIG. 4 position. The pin 194 carried by the belt 166 is in engagement with the reciprocative member 182 and is in the slot 192 of this member. The cam wheel 160 and the drive pulley 168 are in their positions as illustrated in FIG. 4.

The motor 72 is actuated at this time so as to move the carriage 56 in direction 64 to bring the diskette 30 and its groove 70 into exact alignment with the slot 86 and thus in exact alignment with the groove 90. The diskette edge 34a is at rear end 70c (see FIG. 7) of the groove 70 in which the diskette 30 is disposed and is thus at the spacing shown in FIG. 7 between the groove end 70c and the front groove edge 90d. The motor 72 is effective by means of the belt 74 running over the pulleys 78, 80 and 82 for providing this movement of the carriage 56.

The picker assembly 180 is at this time moved toward the front of the machine (toward the right as seen in FIG. 4). For this purpose, the motor 164 is actuated to drive the belt 166 over the pulleys 168, 160 and 170, with the pulley 160 rotating in direction A. The belt 166 propels the reciprocative member 182 by virtue of the pin 194 engaging in the slot 192, and the member 182 together with the picker assembly 180 are moved toward the front of the machine, with the member 182 sliding on the rails 184. This movement is continued until the picker assembly 180 moves through the slot 86 and embraces the diskette 30 which is retained between a pair of the rods 68 and in one of the grooves 70 of the carriage 56. The diskette 30 is prevented from movement forwardly out of the slot 70 by means of any suitable diskette backing portion of the carriage 56 at the end of the diskette holding groove 70 which is remote from the slot 86. The picker assembly 180 in embracing the diskette 30 has its arm 188 moved away from the arm 186 against the spring action of the spring portion 190, with the outwardly diverging cam surfaces on the ends of the arms 186 and 188 allowing the diskette to enter between the arms. The picker assembly 180 then grips or grasps the diskette 30 by the frictional action of the arms 186 and 188 on the diskette 30 under the action of the flat spring portion 190. It is intended that the electromagnet 216 (see FIG. 6) shall be energized at this time so as to cause its armature 214 to swing the blocker 208 to move it out of alignment with the vertical slot 86. The reciprocative member 182 at the end of its movement toward the front of the machine actuates the switch 200 which may be used as desired for controlling the electromagnet 216 and motor 164. It may be noted that the portion of the blocker 208 that crosses the slot 86 is at a lower level than the picker arms 186 and 188 so that the arms 186 and 188 may go their full stroke forwardly with no interference with the blocker 208 even though the electromagnet 216 might be deenergized at the time.

It will be noted that the picker assembly 180 grasps the diskette 30 at a place very close to the lower edge 34b of the diskette which is in contact with the bottom surface 70a of the groove 70. The diskette jacket 34 may for example be eight inches (203 mm) square, and the arms 186 and 188 grasp the diskette between 3/16 inch (4.7 mm) and ⅝ inch (15.8 mm) from the lower edge 34b of the diskette jacket 34 in contact with the bottom 70a of the groove 70, with the diskette arms 186 and 188 being of sufficient width to extend for 3/16 inch (4.7 mm) along the side edge 34a of the diskette jacket 34. There will thus be substantially no couples or tilting due to friction on the diskette 30 as it is subsequently drawn back into the machine. It will be understood that these dimensions are given for the purpose of example only and may well be changed.

With the blocker 208 being out of alignment with the slot 86 by virtue of deenergization of the electromagnet 216, and with the picker assembly 180 engaging the diskette 30, the motor 164 is reversed so as to drive the cam wheel 160 in the direction B by means of the belt 166. The movement of the belt 166 along with the wheel 160 propels the reciprocative member 182 backwardly (to the left as seen in FIG. 4) by virtue of the drive connection between the belt 166 and the member 182 including the pin 194 disposed in the slot 192. The diskette 30 is drawn through the slot 86 in a diskette withdrawal plane by the picker assembly 180 and moves into and through the groove 90. The initial cam portion 90a (see FIG. 7) causes the diskette 30 to move to a level slightly higher than the bottom 70a of the groove 70 when it is in groove 90. The movement of the diskette 30 continues backwardly still in this same plane and with the diskette 30 resting on the groove bottom 90c until the diskette impinges on and is stopped by the protrusion 91 of the backbone 54. The diskette 30 is then in position so that the center of the disk opening 40 is in alignment with the center of the spindle 94 and with the center of the collet 110. A portion of the diskette 30 remains within the slot 86 and part of the diskette protrudes from the slot 86 and lies within the groove 70 in which the diskette 30 was originally positioned, so that the diskette 30 may subsequently be moved fully back into the same slot 70 in which it was originally positioned. If the diskette jacket for example is eight inches (203 mm) square, it may protrude from the slot 86 sufficiently so that 1.9 inches (48 mm) of it may remain in the groove 70. The bottom edge 34b of the diskette jacket 34 rests on the bottom 90c of the groove 90 at this time but has no contact with the bottom 70a of the groove 70 due to the difference in levels of the two groove bottoms. The bottom of the groove 90 at this time thus has the sole control of the level of the diskette 30, which is at its data transferring position with respect to the transducers 142 and 142a. The position of the diskette 30 at this time is shown in FIG. 7.

With the diskette 30 being in engagement with the protrusion 91, movement of the reciprocative member 182 and the picker assembly 180 continues rearwardly until the end of movement in this direction is reached at which the detent spring 198 engages in the notch 196 of the member 182. During this movement of the picker assembly 180 and reciprocative member 182 after the diskette 30 has abutted the protrusion 91, the picker arms 186 and 188 snap back off the diskette jacket 34; and the assembly 180 is drawn off of the diskette 30 and is separated from it. The detent spring 198 then holds the reciprocative member 182 and picker assembly 180 in positions disassociated from the diskette 30 during continued operation of the machine either for magnetically reading or writing on the disk 32. The picker assembly 180 thus has no diskette clamping and disk rotation impeding actions at this time.

On continued rotation of the cam wheel 160 in direction B, the cam 156 contacts the roller 116 and swings the arm 104 clockwise as seen in FIG. 3. The arm 104 is effective through extension portion 112 on the collet 110, and the collet 110 is thus moved into the spindle 94 and through the hole 40 of the diskette 30. The collet 110 is tapered and accurately centers the disk 32 with respect to the longitudinal center line of the spindle 94 and, as the cam wheel 160 continues in its rotation in direction B, clamps the disk 32 between the collet 110 and the spindle 94. The spindle 94 may be in continuous rotation due to the driving action of the motor 98; and, when the disk 32 is so clamped between the collet 110 and spindle 94, the disk 32 is drivingly rotated within its stationary jacket 34 located in groove 90. On this continued rotation of the cam wheel 160, with the accompanying movement of the belt 166, the pin 194 travels about the drive pulley 168 and thus moves out of the slot 192 of the reciprocative member 182. The driving connection between the pin 194 and the reciprocative member 182 is thus broken on this and further rotative movement of the cam wheel 160 in direction B and corresponding movement of the belt 166.

When the collet 110 is in full disk clamping position with respect to the spindle 94 and on continued rotation of cam wheel 160 in direction B, the cam 158 strikes the extension 134 of the swing arm 120 and starts to swing the arm 120 in the clockwise direction as seen in FIG. 5. The tab 148 of the swing arm 140 of the transducer assembly 136 overlies the swing arm 120, and the swing arm 140 of the transducer assembly 136 begins movement toward the disk 32 under the action of the spring 146. The movement of the swing arm 120 continues and finally the transducer 142 fully engages with the disk 32 through a jacket slot 38. The transducer 142 may be held in contact with the disk 32 under the action of other spring means incorporated in the transducer carriage assembly 136 as described in said Castrodale et al application. Likewise, the other swing arm 140a on the other side of the disk 32 is at the same time moved to be in full transducer disk engaged position due to the interconnection between the swing arms 140 and 140a of the transducer assembly as described in said Castrodale et al application.

The pressure member 126 as previously described is carried by the swing arm 120, and the pressure member 126 clamps the diskette 30 between it and the platen surface 132 of the backbone 54. This occurs simultaneously with the transducer engaging motions just described. This clamping action is by virtue of the spring action of the leaf spring 130 between the swing arm 120 and the pressure member 126, with the ears 128 extending to a greater extent through the swing arm 120. The clamping action by the pressure member 126 on the jacket 34 is upstream (considering the direction of disk rotation C) of the slots 38 in the jacket 34 through which the transducers 142 and 142a extend, the disk rotation direction C being in the clockwise direction as seen in FIG. 8. The spring 130 is of insufficient strength to provide a substantial impedance to the rotation of the disk 32 through the pressure member 126 but is of sufficient strength so that the pressure member 126 maintains the disk 32 in a single desired plane. With the disk 32 being in this plane and with the transducers 142 and 142a being in engagement with the disk 32 through the slots 38, the transducers may be utilized for either writing data on the disk 32 magnetically or magnetically reading previously written data on the disk 32. The transducers 142 and 142a may be moved radially of the disk 32 in the radially extending slots 38 so as to prescribe different concentric magnetic tracks on the disk 32 as the disk rotates by so actuating the motor 150 to move the transducer assembly 136 along the guide rods 138, with the band 151 providing the driving connection between the motor 150 and the transducer assembly 136.

After a data transfer has taken place using the transducers 142 and 142a, the motor 164 is reversed so as to rotate the cam wheel 160 in the direction A. The cam 158 first moves off of the extension 134 of the swing arm 120, and the transducers 142 and 142a are thus disengaged from the disk 32. The swing arm 120 moves under the action of its return spring 124 during this action. The pressure plate 126 is withdrawn from engaging relationship with the platen surface 132 with the same movement of the swing arm 120 so that the diskette 30 is unclamped. With further rotation of the cam wheel 160 in direction A under the action of the motor 164, the cam 156 rides off of the roller 116 and allows the arm 104 to swing in the counterclockwise direction as seen in FIG. 3. The swing arm 104 and particularly its extension 112 are then effective to pull the collet 110 out of the driving spindle 94 and completely disengage the collet with respect to the disk 32.

During this rotation of cam wheel 160 in direction A, the belt 166 of course moves along with the wheel 160, since it has a toothed engagement with the periphery of the wheel 160. The pin 194 travels down toward the drive pulley 168 and finally enters the slot 192. With further rotation of the wheel 160 in the direction A, the reciprocative member 182 and picker assembly 180 move toward the front of the machine (toward the right as seen in FIG. 4).

With a slight additional movement of the reciprocative member 182 and picker assembly 180 from the position at which the detent spring 198 is in engagement with the sides of the notch 196, the picker assembly 180 contacts the diskette 30 and begins to move the diskette 30 farther out of the groove 90 and farther into the carriage groove 70 in which the diskette 30 was originally placed. About ¼ of the length of the bottom diskette edge 34b remains in the groove 70 in the data transferring position of the diskette 30, so there is no question that the diskette may be returned into any other than its original groove 70. The upwardly slanting rods 68 support and guide the upper portion of the diskette 30 in this forward movement of the diskette. Initially, the picker arms 186 and 188 may not embrace the diskette 30, since the pressure provided by the flat spring portion 190 is effective to hold the ends of the arms 186 and 190 in somewhat forceful engagement; but the picker assembly 180 nevertheless is effective for moving the diskette 30 forwardly farther into its original groove 70.

As the motor 164 continues to drive the cam wheel 160 in the direction A, the reciprocative member 182 and picker assembly 180 continue to propel the diskette 30 forwardly in the original groove 70, until finally the diskette 30 rides down the cam surface 90a and reaches the end of the groove 70 with its complete edge 34b resting on the groove bottom 70a. The diskette 30 has then passed completely through the slot 86 and is then completely out of the machine. The picker assembly 180 may then at this time embrace and grip the diskette 30, but this is of no consequence. At this position of the reciprocative member 182, the switch 200 is actuated for control purposes. The electromagnet 216 may be either energized or deenergized during this movement of the diskette 30 into its original groove 70. If the electromagnet 216 is in deenergized condition at this time, the return spring 218 is effective to hold the blocker 208 against the diskette 30 as it travels out of the groove 90, but the return spring 218 is of insufficient effect to provide any substantial impediment to this disk movement.

In order to complete the operation, the electromagnet 216 is deenergized if it has not been previously deenergized; and the spring 218 is effective to swing the blocker 208 so that it lies across the slot 86. The diskette 30 lying in the slot 70 into which it has just been fully thrust as just described then can have no movement back into the machine. The motor 164 is again reversed to drive the cam wheel 160 in the direction B, and the reciprocative member 182 and the picket assembly 180 are moved back into the machine. The picker assembly arms 186 and 188 snap back off of the diskette jacket 34, and the diskette 30 that has been previously moved into the machine for a reading or writing action is completely released. The carriage 56 may then be moved in direction 64 under the actuation of the motor 72 to move another of the diskettes 30 within another groove 70 and between other spaced rods 68 into alignment with the slot 86 so that a corresponding reading or writing action may take place with respect to this diskette.

Diskettes 30 are held in vertical spaced relation within a magazine 42 by grooves 44 and particularly by the flat side surfaces 44b thereof and may be similarly drawn into the machine through slot 86 for a reading or writing action and returned into the same groove 44 within the magazine. It is only necessary that the desired diskette within certain vertically aligned upper and lower grooves 44 in the magazine be moved initially into alignment with the slot 86 by translating the carriage 56 in direction 64 to accordingly move the magazine. The machine then functions in the same manner as has been previously described in connection with one of the free diskettes 30 held by rods 68, with the picker arms 186 and 188 reaching into the magazine to pull a diskette 30 out of the magazine and finally returning the diskette 30 after data transfer. The diskette 30 in its movement partially out of aligned upper and lower grooves 44 and into groove 90 travels along the flat groove bottom surfaces 44a, and at least corners on the upper and lower diskette edges 34b and 34d are in sliding contact with the groove bottoms 44a during most of the movement of the diskette 30 partially out of and then again back into the original grooves 44 for the diskettes.

The flat surfaced groove bottoms 44a, 70a and 90c matching the straight bottom and top edges 34b and 34d of a diskette 30 assure an easy movement of a diskette 30 through groove 90 and into contact with abutment 91 for data transfer and assure an easy return movement of the diskette 30 to be fully in the grooves 44 or in the groove 70. The flat side groove surfaces 44b, 70b and 90b match the normally flat surfaced jacket 34; and, even though the jacket 34 may be slightly warped due to improper storage, nevertheless, the diskette 30 moves through the grooves 44, 70 and 90 without jamming due to the existence of the flat groove sides 44a, 70b and 90b. This is particularly true since the jacket 34 is square, and the marginal portions of a jacket 34 adjacent the edges 34b and 34d tend to remain in flat face to face contact with the flat groove side surfaces 44b, 70b and 90b. Since a diskette 30 is withdrawn out of the grooves 44 or a groove 70 for only about 75% of the length of the diskette measured along the upper and lower diskette edges 34b and 34d, there is no question but that the diskette moves back into its original grooves 44 or original groove 70 rather than into other grooves 44 or 70. This same diskette may then be easily located for a second, later data transferring action by moving carriage 56 in direction 64 to its original position for this diskette. The disk drive machine is also shortened from its length that would otherwise be necessary, since the original and data transferring positions of a diskette 30 overlap by about 25 percent of the length of the diskette.

As the carriage 56 is illustrated, it has three of the individual diskette supporting grooves 70, and these constitute "easy load" grooves for supporting just this few number of diskettes 30 for the rapid and convenient feeding of one, two or three diskettes 30 possible without first loading a magazine 42. The diskettes 30 can be quickly positioned in these grooves 70 without involving a magazine 42, and any one of these individually loadable diskettes can be selected and loaded just as if it was in one of the magazines 42. The "easy load" grooves 70 can be used either with or without the magazines 42 in place. In brief, the following three significant functions are provided by the "easy load" grooves 70:

1. The "easy load" grooves 70 provide the convenience of using the automatically loading disk drive as if it were a conventional diskette drive for the insertion of a single diskette. This usage will occur in cases in which a relatively small amount of I/O (Input/Output) data exchange is required with another product employing a disk drive.
2. In cases in which two or three diskettes 30 may be involved in a data exchange, not normally of a save/restore nature, the use of these three grooves 70 combines not only the convenience of easy accessibility to the drive for these diskettes but also provides the automatic loading and selection function in which the carriage 56 is moved by the stepping motor 72 to its stepped positions in which one of the grooves 70 is aligned with the groove 90.
3. The individual diskette receiving grooves 70 eliminate unnecessary loading of the magazines 42 and unloading thereof which exposes a disk to possible contamination by reason of finger contact through the jacket slots 38.

In contrast with the individual diskettes 30 used in the grooves 70, the magazines 42 have sets of ten vertically aligned grooves 44 so that the magazines may each contain ten of the diskettes 30. The diskettes 30 are those which are normally used as a group, such as in a save/restore operation; and it is desirable that these diskettes be stored together and in the same sequence. The magazines 42 efficiently provide this function.

We claim:

1. A machine for providing data transference with disk-jacket assemblies which include information carrying disks rotatably disposed in thin flat rectangular jackets having a certain length measured parallel with a base edge of the assembly, each of said jackets having coincident central holes in its two thicknesses and having an elongate hole in one jacket thickness extending parallel with a base edge of the jacket and between an adjoining front edge of the jacket and the center of said central holes, said machine comprising:

storing means for storing a stack of said disk-jacket assemblies, position defining means defining a data transferring position of a disk-jacket assembly in the plane of one of the disk-jacket assemblies in said stack and which is located closer to the position of the disk-jacket assembly in said stack then the length of the jacket and measured along the base edge of the disk-jacket assembly from the front edge of the disk-jacket assembly in said stack to the front edge of the disk-jacket assembly when in said data transferring position so that said central holes and said elongate hole of the disk-jacket assembly when in said data transferring position ae exposed with respect to the remaining disk-jacket assemblies in said stack and the disk-jacket assembly when in said data transferring position retains its place in said stack, means for moving said storing means and said position defining means with respect to each other so that any of said disk-jacket assemblies in said stack may be in said plane, means operative to move the disk-jacket assembly which is in said plane and in said stack in the direction of its base edge with its front edge foremost for said distance less than the base edge length into said data transferring position so that said central holes and said elongate hole of the disk-jacket assembly are exposed and so that the disk-jacket assembly retains its place in said stack, drive means positioned outside of said stack so as to extend through said central holes in the jacket of the disk-jacket assembly in said data transferring position for driving the disk thereof, and a transducer positioned outside of said stack so as to be moveable into said elongate hole in the disk-jacket assembly in said data transferring position for a transfer of data with respect to the disk thereof.

2. A machine as set forth in claim 1 and including guide means effective on said base edge of a disk-jacket assembly in said plane and in said stack for guiding the disk-jacket assembly from its position in said stack to said data transferring position.

3. A machine as set forth in claim 1, said position defining means including means defining a receptor groove for receiving a said base edge of a disk-jacket assembly and said storing means including additional groove defining means providing a series of store grooves each for receiving a said base edge of a disk-jacket assembly.

4. A machine as set forth in claim 3, and including abutment means carried by said position defining means and effective for limiting the movement of a disk-jacket assembly into said receptor groove so that the disk-jacket assembly remains in its place in said stack.

5. A machine as set forth in claim 1, said position defining means constituting a stationary unit and said storing means constituting a carriage moveably mounted with respect to said stationary unit.

6. A method for transferring data with respect to information carrying disks rotatably disposed in thin flat rectangular jackets each having coincident central holes in its two thicknesses and having an elongate hole in one jacket thickness extending parallel with a base edge of the jacket and between an adjoining front edge of the jacket and the center of said central holes to form disk-jacket assemblies, the steps which comprise:

placing said disk-jacket assemblies in a stack with their said front edges in alignment on one face of the stack, moving a selected one of the disk-jacket assemblies in said stack with its said front edge foremost only partially out of the stack so that it retains its place in the stack and for a distance which exposes its said aligned central holes and its said elongate hole with respect to the remainder of the disk-jacket assemblies in the stack, driving the disk of the disk-jacket assembly so partially removed from the stack utilizing driving means extending through said central holes, and inserting a transducer through the elongate hole of the disk-jacket assembly so partially removed from the stack for transferring data with respect to the disk thereof.

* * * * *